(12) United States Patent
Kvatinsky et al.

(10) Patent No.: US 10,708,041 B2
(45) Date of Patent: Jul. 7, 2020

(54) MEMRESISTIVE SECURITY HASH FUNCTION

(71) Applicant: Technion Research & Development Foundation Limited, Haifa (IL)

(72) Inventors: Shahar Kvatinsky, Ramat-Gan (IL); Leonid Azriel, Haifa (IL)

(73) Assignee: Technion Research & Development Foundation Limited, Haifa (IL)

( * ) Notice: Subject to any disclaimer, the term of this patent is extended or adjusted under 35 U.S.C. 154(b) by 248 days.

(21) Appl. No.: 15/965,924

(22) Filed: Apr. 29, 2018

(65) Prior Publication Data

US 2018/0316493 A1 Nov. 1, 2018

Related U.S. Application Data

(60) Provisional application No. 62/492,246, filed on Apr. 30, 2017.

(51) Int. Cl.
*H04L 9/06* (2006.01)
*G11C 13/00* (2006.01)
*H04L 9/32* (2006.01)

(52) U.S. Cl.
CPC .......... *H04L 9/0643* (2013.01); *G11C 13/004* (2013.01); *H04L 9/3242* (2013.01); *G11C 13/0069* (2013.01); *G11C 2013/0042* (2013.01)

(58) Field of Classification Search
CPC ... H04L 9/0643; H04L 9/3242; G11C 13/004; G11C 13/0069; G11C 2013/0042
See application file for complete search history.

(56) References Cited

U.S. PATENT DOCUMENTS

2014/0281121 A1* 9/2014 Karamcheti ............ G06F 3/061
  711/102
2017/0285961 A1* 10/2017 Li ........................ G06F 3/0605
2019/0147941 A1* 5/2019 Qin ...................... G11C 11/419
  711/102

OTHER PUBLICATIONS

Mathew, Jimson et al., "A Novel Memristor-Based Hardware Security Primitive", ACM Transactions on Embedded Computing Systems, vol. 14, No. 3, Article 60, Publication date: Apr. 2015, 20 pages. (Year: 2015).*
Virtudez, Kristine Jean Diane A. et al., "FPGA Implementation of a One-Way Hash Function Utilizing HL11-1111 Nonlinear Digital to Analog Converter", TENCON 2012 IEEE Region 10 Conference, 5 pages. (Year: 2012).*

(Continued)

*Primary Examiner* — Michael Pyzocha

(57) ABSTRACT

Apparatus and method for hashing a message, comprises using an array of individually selectable memristor cells. The memristor cells are subject to write disturb that affects cells neighboring a selected cell so that a write operation into one cell has a knock-on effect on the neighbors. The array is initiated into a known stable state so that these changes to neighboring cells are predictable according to proximity to the currently selected cell. An inserter sequentially mixes bits with the hash so far to insert bits into successively selected cells of the memristor array and forms a succession of memristor array states including the knock on effects on the neighboring cells. A final resulting memristor array state following input of the bits forms the hash of the message.

25 Claims, 6 Drawing Sheets

(56) References Cited

OTHER PUBLICATIONS

Wang, Yandan et al., "A Novel True Random Number Generator Design Leveraging Emerging Memristor Technology", GLSVLSI'15, May 20-22, 2015, pp. 271-276. (Year: 2015).*

Liu, Yang et al., "Combined Compute and Storage: Configurable Memristor Arrays to Accelerate Search", Published in ArXiv 2016, pp. 1-12. (Year: 2016).*

* cited by examiner

MEMRESISTIVE SECURITY HASH FUNCTION

RELATED APPLICATION

This application claims the benefit of priority under 35 USC § 119(e) of U.S. Provisional Patent Application No. 62/492,246 filed on Apr. 30, 2017. The contents of the above applications are all incorporated by reference as if fully set forth herein in their entirety.

FIELD AND BACKGROUND OF THE INVENTION

The present invention, in some embodiments thereof, relates to a security hash function for use with memristive technology.

Emerging nanoelectronic memristive technologies, such as Resistive RAM (ReRAM), Phase Change Memory (PCM), and Spin-Torque Transfer Magnetoresistive RAM (STT-MRAM), promise to provide an alternative to the ubiquitous CMOS technology, aiming to replace the conventional DRAM and Flash memories. No less important, the unique properties of memristors and their compatibility with the CMOS process make it possible to create conceptually new digital and analog circuits. CMOS compatibility, along with a combination of properties such as non-linearity, non-volatility and sensitivity to process variations, make this technology appealing for embedded security applications.

The memristor is a passive device that changes its resistance under an applied electrical current. Chua coined the term memristor where he speculated on the existence of a fourth passive element. Chua's memristor theory was linked to the resistive switching phenomenon and, since then the interest in memristor research, including security with memristors, has grown significantly. Several research groups reported on building security primitives with memristor technology. For example, true random number generators have been proposed, leveraging the stochastic properties of memristors and telegraph noise in resistive RAM.

Another important security primitive is the Physical Unclonable Function (PUF), which utilizes intrinsic process variations to generate a unique response to a challenge per device instance. Recently, several researchers suggested exploiting the unique characteristics of memristive devices to increase the entropy and sensitivity to process variations in PUFs. Conceptually new memristive PUF architectures have also been proposed. For example, a fabricated PUF device that comprises a memristive crossbar memory array has been proposed in which process-variation based differences between memristor resistance values serve as an entropy source. A memristive crossbar PUF that utilizes variations in memristor write time as well as the parasitic sneak path effect during read has also been proposed.

The secure hash function is a fundamental component of modern cryptography. It enables important security applications such as digital signature and integrity validation. The state of-the-art secure hash functions are based on mathematical algorithms, such as SHA, SHA-2, SHA-3 or MD5. Pure software implementations of these algorithms often fail to provide sufficient performance and security. Hence, hardware accelerators that use digital logic to implement the hash algorithms are commonly used. To construct a keyed-hash message authentication code (HMAC), the key is managed separately. In contrast to the classic approach, pure hardware implementations of secure hash functions utilize intrinsic properties of the hardware to create entropy. Few pure hardware hash implementations have been proposed, and those have been mainly based on chaotic systems. Intrinsic implementations of secure hash functions promise great improvement in power and area efficiency. However, they fail to provide sufficient robustness.

SUMMARY OF THE INVENTION

In the spirit of the PUF concept, the present embodiments provide a memristive hardware hash function. A function according to the present embodiments may use discrete quasi-stable states, in which the memristor drift rates are sufficiently slow, along with differential reads to increase robustness and accuracy. The embodiments may leverage manufacturing variation in the memristor cells to increase the entropy of the hash.

According to an aspect of some embodiments of the present invention there is provided apparatus for hashing a message, comprising:

an array of individually selectable memristor cells, the array being subject to write disturb in cells neighboring a selected cell and wherein the array may be initiated into a state in which changes to the neighboring cells are predictable according to a respective proximity to a currently selected cell; and an inserter configured for sequential insertion of bits into successively selected cells of the memristor array to form a succession of memristor array states, the memristor array states thereby forming a hash.

Embodiments may comprise a differential reader to read the memristor array states.

Embodiments may comprise a message input for entering a message as a sequence of bits for supplying to the inserter, wherein the inserter comprising a scrambler configured to scramble the bits with the hash for the successive insertion.

In an embodiment, the message input is configured to add at least one prefix and at least one suffix to the message.

In an embodiment, the memristor is in a quasi-stable state during the bit insertion.

In an embodiment, the array is configured to be initialized to a known state.

In an embodiment, the known state is a state wherein the array is balanced with a substantially equal number of cells in high and low states respectively.

In an embodiment, the quasi-stable state is a state in which the rate of change of all the cells in the array is lower than a predetermined threshold.

In an embodiment, the scrambler maintains an internal wraparound counter configured to count modulo the number of rows.

In an embodiment, at each cycle the scrambler is configured to read from a row pointed by the internal wraparound counter.

In an embodiment, the scrambler is configured to implement a linear function of an input bit, a cycle count and a value read from the array and to generate an address and a value for writing into the array.

In an embodiment, the array is a crossbar array with at least 256 cells.

In an embodiment, the write disturb is sensitive to manufacturing processes.

According to a second aspect of the present invention there is provided a method for hashing a message, comprising:

providing an array of individually selectable memristor cells, the array being subject to write disturb in cells neighboring a selected cell;

initializing the array into a quasi-stable state in which changes to the neighboring cells are predictable according to a respective proximity to a currently selected cell;

sequentially selecting cells in the array;

sequentially inserting bits into currently selected cells of the memristor array to form a succession of memristor array states, a final one of the memristor array states thereby forming a hash.

Embodiments may comprise differentially reading the memristor array to read the hash.

Embodiments may comprise entering a message as a sequence of bits and scrambling the bits for the sequentially inserting.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1:
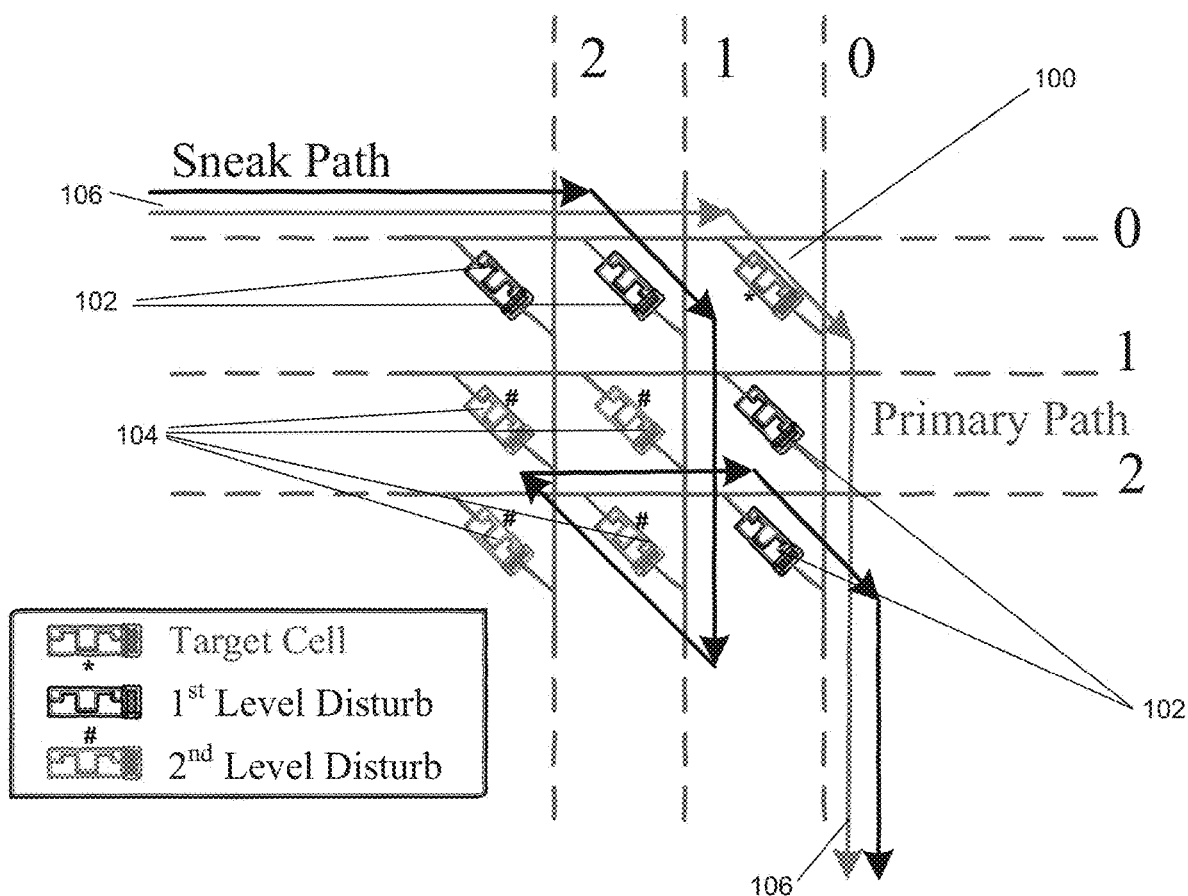
FIG. 1 is a simplified diagram showing cells in a crossbar array and showing sneak or stray paths for the current when cells are initialized according to the present embodiments and when one of the cells is selected.

The present invention, in some embodiments thereof, relates to a security hash function for use with memristive technology.

Hardware based hash functions may provide a low cost and low power alternative to the classic solutions, which are based on implementations of mathematical cryptographic algorithms, and the present embodiments provide a hardware secure hash function built using memristive technology that exploits the unique properties of memristors.

The present embodiments leverage the manufacturing variations of the memristor array to increase the entropy of a hash written into the array. More particularly, a function according to the present embodiments may employ a memristive crossbar array that exploits the parasitic write disturb phenomenon to achieve higher entropy, and may take advantage of process variations to create a unique and unclonable key per instance. The function accepts messages with arbitrarily long length. Thus, it is essentially a keyed secure compression function. The key is embedded in the circuit and cannot be exported, and a function according to the present embodiments may use discrete quasi-stable states, in which memristor drift rates are sufficiently slow, along with differential reads to increase robustness and accuracy, thus being suitable for applications where the generator and the verifier of the signature are the same entity. For example, a function according to the present embodiments may be used for an integrity check of a local memory.

The function uses an array of individually selectable memristor cells, for example arranged as a crossbar array. The memristor cells are subject to write disturb that affects cells neighboring a selected cell so that a write operation into one cell has a knock-on effect on the neighbors. The array is initiated into a predetermined stable state so that these changes to neighboring cells are predictable according to proximity to the currently selected cell. An inserter mixes incoming bits with the current state of the hash and sequentially inserts bits into successively selected cells of the memristor array to form a succession of memristor array states including the knock on effects on the neighboring cells. The final memristor array state after all bits in a sequence have been input, form the hash of the message.

A function that performs hashing as described above, termed herein MemHash, is based on intrinsic device characteristics of the Memristor array. Furthermore, it exploits process variations for implicit key embedding, and may thus create a keyed-hash message authentication code (HMAC) that does not involve a separate key generation and management process.

MemHash and other functions according to the present embodiments, may use a memristive crossbar with a differential read mechanism and a scrambler unit. The scrambler unit receives an input message as a bit stream and digitally mixes it with data read from the array. For every bit of the message, the scrambler generates a write address and a value to perform a single-cell write cycle to the crossbar. Because the crossbar is designed to be extremely sensitive to the write disturb phenomenon, every single-cell write alters additional cells in the design, thus increasing the entropy. The differential read mechanism provides sensitivity to process variations and robustness in operating conditions, yielding a PUF-like effect.

The function is evaluated with a 16×16 memristive crossbar structure. A simulation, included as one of the present embodiments, demonstrates the statistical characteristics of the proposed design, showing close-to-optimal uniqueness and diffuseness.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 3:
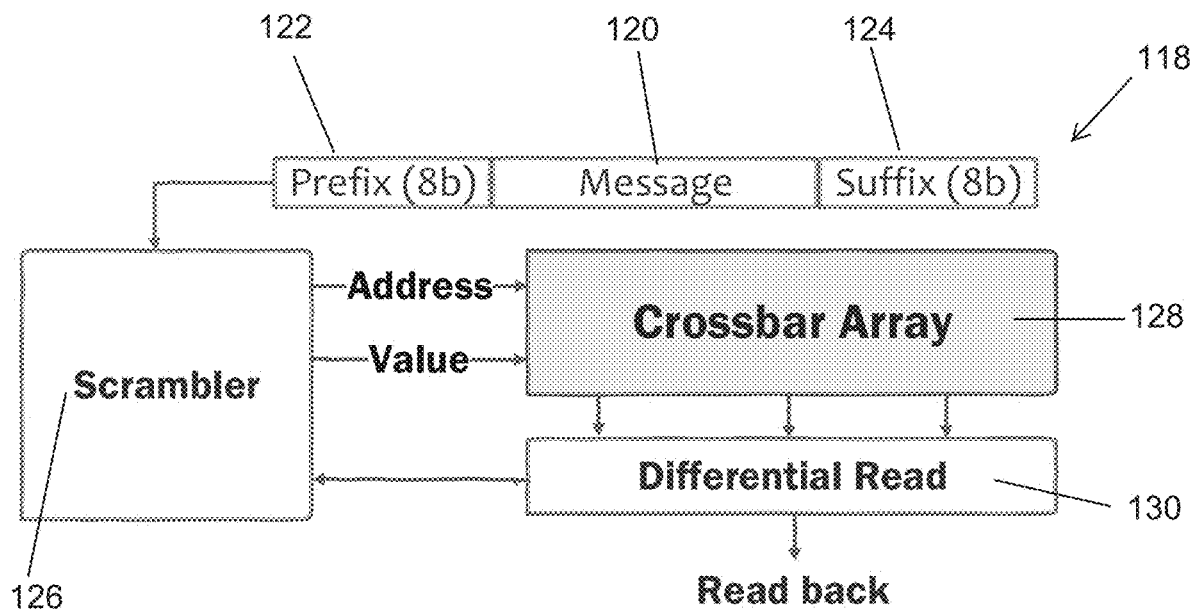
FIG. 3 is a block diagram showing apparatus according to the present embodiments for creating and reading a hash using a memristor array.

Referring now to the drawings, FIG. 3 illustrates apparatus 118 for hashing a message 120 using a crossbar array 128 based on memristive cells, and FIG. 1 shows some of the individual memristive cells in the array 128. Thus the array 128 of FIG. 3 consists of individually selectable memristor cells such as cell 100 in FIG. 1. The array is subject to write disturb in cells neighboring selected cell 100 such as those numbered 102 which share a row or column line with the selected cell and therefore gain a sneak path 106 for current, and cells 104 which are one removed from the selected cells and also gain access via the closer neighbors to the sneak paths. The array may be initiated into a quasi-stable state in which changes to the neighboring cells are predictable according to a respective proximity to a currently selected cell, so that cells which are direct neighbors of the selected cell may react in a particular way to a state change in the selected cell, and cells which are indirect neighbors may likewise react in a particular way to the same state change, but not necessarily in the same way as the directly neighboring cells.

A scrambler 126 may receive the message 120, and any prefix 122 and suffix, 124 that may have been added, may scramble the received bits together with the current hash state and then may carry out sequential insertion of the bits into successively selected cells of the memristor array 128. The scrambling may provide both the next bit to insert and the cell to insert the next bit into. The inserted bits influence not just the cell selected but also the neighboring cells due to the write disturb effect. Changes to the non-selected cells form part of the resulting hash, so that the inserted sequence forms a succession of memristor array states which, while repeatable, are difficult to relate to the input and thus reverse.

The array 128 may be read using differential reader 130, as will be discussed in greater detail below.

The scrambler 126 may have a message input for entering a message as a sequence of bits for scrambling.

In the quasi-stable state according to one embodiment that is entered while inserting a cell, a cell 102 sharing either a row or a column with a selected cell, changes in the same way as the selected cell. By contrast, a cell 104 once removed from sharing the row or column changes in a way opposite to that of the selected cell. Other examples may work in different ways and manufacturing differences may introduce irregularities into the way in which individual cells behave.

The array may be initialized with cells in alternating high and low states in order to achieve the predictability of the quasi-stable state.

Figure 2:
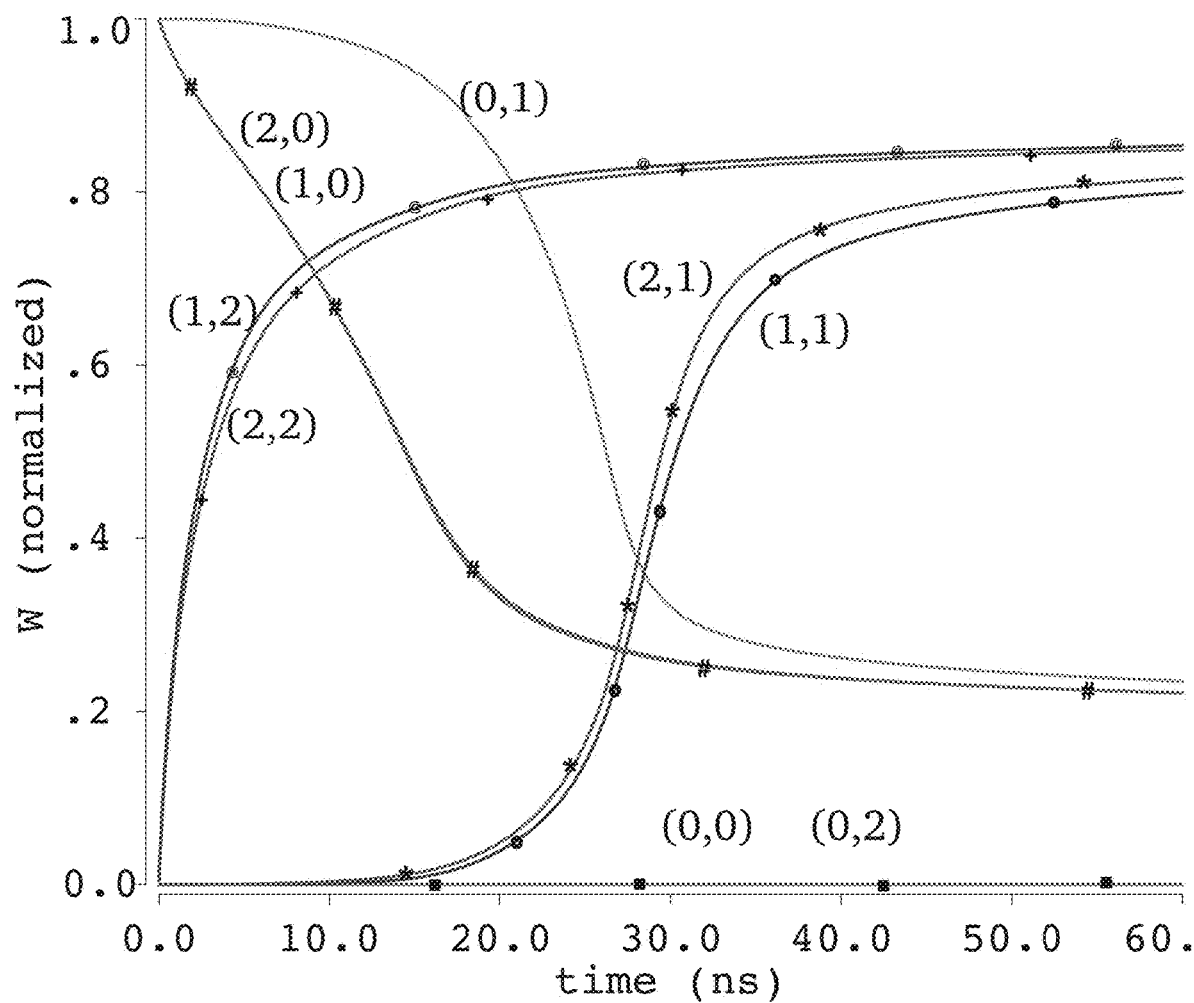
FIG. 2 is a graph showing state transitions of selected and neighboring cells during a cycle according to embodiments of the present invention.

In the quasi-stable state, a rate of change of all the cells in the array may be lower than a predetermined threshold, as shown in FIG. 2 and discussed hereinbelow.

The scrambler selects not only the bit to be output but also the cell to be selected, and may be set to select cells in successive rows going through the array. The scrambler may thus use an internal wraparound counter to count modulo the number of rows and then return to the beginning for another round. The scrambler may read from or write to cells in the row currently pointed to by the internal wraparound counter.

The scrambler may implement a linear function of an input bit, a cycle count and a value read from the array and thus generate an address for selecting and a value for writing into the array.

The array may be a crossbar array with at least 256 cells.

Figure 6:
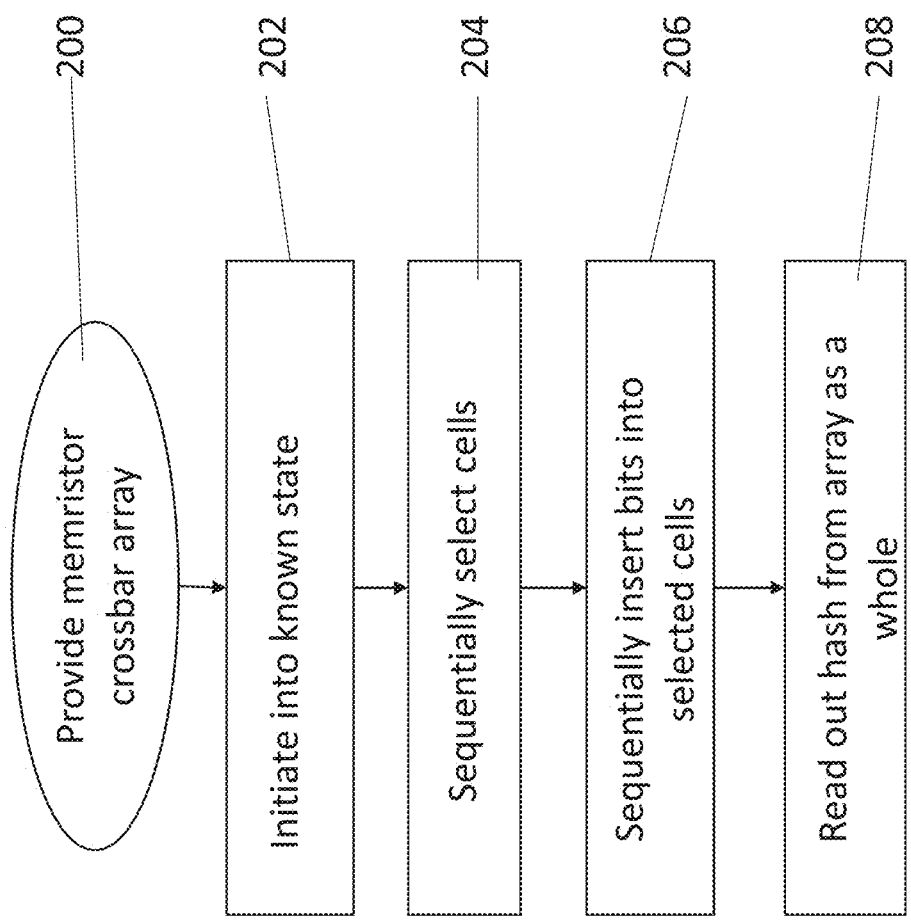
FIG. 6 is a simplified flow chart showing a process for hashing using a memristor array according to the present embodiments.

Reference is now made to FIG. 6, which illustrates a method for hashing a message involving providing 200 an array of individually selectable memristor cells in a crossbar array. The array is subject to write disturb in cells neighboring a selected cell during writing operations. In box 202 the array is initialized into a known and stable state in which changes to the neighboring cells are predictable according to a respective proximity to the currently selected cell. Typically the numbers of cells in high and low states are balanced. One way of doing this is to have cells in alternating high and low states. In box 204 sequential selections are made of cells across the array, and in box 206 bits are sequentially inserted into the currently selected cells of the memristor array. The inserted bit spills over to the neighboring cells to change the direct and some of the indirect neighbors to form a succession of memristor array states, and the memristor array states may be read out as a whole to form the hash.

A. Crossbar Array and Write Disturb

The crossbar is a fundamental structure used for building memory with resistive cells. It requires no additional elements other than the memristors, which makes it superior in area efficiency. However, a significant drawback of the crossbar is in the sneak paths, parasitic current paths through unselected memory cells, resulting from the absence of switching elements in the array. The sneak paths distort the read value during read and modify unselected cells during write, in a phenomenon known as write disturb. These side effects make it difficult to build large and robust crossbar memory arrays. However, side effects that add entropy, if made predictable, can be harnessed for security applications. One such application is a secure hash function.

To create a secure hash function, we consider the state of the entire array, or array part being used, as a hash state. Individual cells are selected for writing based on the input message and the previous state. No write disturb mitigation is implemented. Hence, during a write, in addition to the target cell, other cells are modified. Referring again to FIG. 1, there is shown a schematic diagram of a memristive crossbar memory segment illustrating what happens during a write operation. Target cell 100 is the cell selected for the write. Further cells 102 sharing the same row or column as the selected cell are the first-level disturb cells. The first level disturb cells 102 change in the same direction as the target cells. The remaining cells 104 are the second-level disturb cells. Typically, the second level disturb cells change in the opposite direction, and furthermore they obtain the least current and thus change more slowly. Thus we define two types of cells, first level disturb cells and second level disturb cells in relation to any given target cell. First level disturb cells are the cells that share either the row or the column with the target cell and are first in line in a current sneak path to the activated primary current path 106. The resistances of these cells change in the same direction as the target cell. All the remaining cells, the second-level disturb cells, have a more convoluted route to the primary current path 106 and typically, their resistance changes in the direction opposite of the target cell. The number of first-level disturb cells in an n-bit array is $O(\sqrt{n})$, and the number of second-level disturb cells is $O(n)$. Hence, for current-controlled memristors, the latter, that is the second level cells, get less current and, as a result, change more slowly.

Every write operation places the array in a new state that depends on the previous state, the write address and the write data. The number of states may be sufficiently large to resist brute-force and modeling attacks. Binary encoding—i.e., using a high resistance state (HRS) and low resistance state (LRS)—limits the state space, since, due to the write disturb phenomenon, all the disturb cells of the same level move towards the same value. To increase the state space, the function design of functions according to the present embodiments allows intermediate resistance states for the memristor cells, in addition to the full low and high resistance states. Intermediate states are achieved by using a voltage level sufficiently low so that the system may reach equilibrium, where all the memristor resistances remain at intermediate values as a result of the current having been reduced below a prechosen threshold. We define such a state as stable. However, reaching the stable state may take an unacceptably long time. Additionally, the number of possible stable states may in some circumstances be insufficient from a security perspective. Thus, the present embodiments additionally or alternatively make use of states which may be defined as quasi-stable. A quasi-stable state is a state in which the rate of change of all the cells in the array is lower than a certain threshold, so that the state may be considered as stable for practical purposes.

Reference is now made to FIG. 2, which illustrates a single write operation to a 3×3 memristive crossbar array starting with such a quasi-stable state. The vertical axis shows a normalized internal state of the memristors (W). W=0 means Low Resistance State, and W=1 means High Resistance State. To demonstrate a single step, consider a 3×3 crossbar array in a similar structure as shown in FIG. 1. Any cell has a location (i; j) and uniquely connects a row i with a column j. Assume the initial state of the array is as follows: cells (0;1), (1;0) and (2;0) are in HRS, and all the remaining cells are in LRS. A negative voltage is applied between row 0 and column 0. When applied to a bipolar memristor, the negative voltage changes the state of the memristor toward LRS.

FIG. 2 illustrates the response of the memristors' internal states to the write pulse. The target cell (0;0) is already in LRS, hence the cell remains unaltered. Cell (0;2) is also at low resistance; hence, relatively high positive current flows through cells (1;2) and (2;2), causing them to start moving towards HRS. In parallel, column 0's first-level disturb cells move towards LRS. Cell (0;1) starts moving in the same direction, but with a delay. The delay results from smaller current flowing through the cell, due to the parallel connection with (0;2). Once the resistance of (0;1) is reduced, the neighboring second-level disturb cells (1;1) and (2;1) obtain sufficient current to change their states. At the end, the system is stabilized at a new quasi-stable state. The slight differences between the change rates of different cells, e.g., cells (1;1) and (2;1), result from variations in their electrical parameters. The dependency on electrical parameters allows the process variations to be simulated and thus allows the process to be predicted.

Memristive devices are generally sensitive to process variations. PUF designs exploit this sensitivity to create unique and unclonable instances on each unit. This is also a component of the concept of the present embodiments. Process variations serve two goals:

(1) They increase entropy and generate a complex circuit resistant to modeling attacks, and (2) they generate a keyed hash function with a unique and unclonable key per instance.

While sensitivity to the process is essential for functions according to the present design, the circuit is still required to provide reliable results under different operating conditions. The present embodiments thus address the issue of reliability with a differential read. The columns are divided into pairs, and each pair is connected to the two inputs of a sense amplifier. Thus, unlike a conventional single-ended read mode, differential read essentially compares the resistances of two adjacent cells in the addressed row. Besides providing reliability, the differential read also obfuscates the array contents from the user. Rather than reading the memristor values, an attacker can only see the results of a comparison, which complicates modeling attacks. In contrast to reads, writes are always single ended.

The size of the memory array may be sufficiently large to prevent birthday attacks that find collisions within the time of $O(\sqrt{2^k})$, where k is the number of bits in the hash value. This means that the hash value may be at least 128 bits. Due to the differential read, the size of the crossbar array may thus be twice as big, that is 256 (16×16) bits.

B. MemHash Architecture

Reference is now made to FIG. 3, which illustrates an exemplary 8-bit MemHash architecture. An original message 120, is wrapped with a constant prefix, here an 8 bit prefix 122 and a suffix, here also 8 bits and denoted 124. The resulting message is fed serially to scrambler 126. The scrambler implements a linear function of the input bit, the cycle count and a value read from the crossbar array 128, from which it generates an address and a value for writing into the array. The array is connected to a differential read circuit 130 that produces an input to the scrambler 126 for the next cycle and a signature read-back.

That is to say, the user message 120 is first wrapped with an 8-bit constant prefix 122 and suffix 124. MemHash processes the input stream serially, one bit per cycle. The scrambler 126 maintains an internal wraparound counter counting modulo the number of rows. At each cycle the scrambler reads from the row pointed by the counter.

The value read from the row is mixed with the current bit to compose the address (row and column) of the target cell. The value to be written (0 or 1) is determined by performing an exclusive OR between all the bits of the row and the current bit of the message.

To guarantee repeatability, the array is initialized to a known state at the beginning of the hashing process. In the initial state, each cell is in either the full LRS or the full HRS. The initialization write may be required to be accurate: namely, write disturb must be prevented. This can be achieved, for example, by a slow write with lower voltage. The 8-bit prefix brings each instance of the array to a different random state, and the 8-bit suffix prevents attacks that modify the trailing bits in the message. The detailed algorithm and the scrambling function of the MemHash Scrambler block is provided below as Algorithm 1 in table 1.

Algorithm 1 MemHash Scrambler Algorithm
1: Initialize array to alternating LRS/HRS values
2: pointer=0
3: prefix=10101010
4: suffix=01010101
5: input=(prefix;message;suffix)
6: while input not empty do
7: b=pop 1 bit from input
8: row=(4 LSBs from Array[pointer]+b) % numrows
9: col=(4 MSBs from Array[pointer]+b) % numcols
10: writevalue=XOR(row % 2, col % 2,b)
11: Write writevalue to cell address (row, col)
12: pointer=(pointer+1) % numrows
13: end while
Table 1—Algorithm 1

C. Memristor Model and Parameters

Memristors may be either voltage or current controlled. The regular structure of the crossbar makes the voltage controlled model more predictable; hence we chose the current controlled model for the hash application. For simulations, we use the TEAM model as discussed below. We simulate the process variations by modifying five parameters of the model. Ron, Roff and D reflect variance in resistance, and $i_{on}$ and $i_{off}$ reflect variance in the change rate.

The memristor device parameters are selected to maintain most of the memory cells at intermediate resistance for any given balanced sequence of operations. The scrambling function guarantees the balance of '0' and '1' write values.

Experimental Results

A. Experimental Setup

A function according to the present embodiments called MemHash is tested. For performance evaluation of MemHash, we simulate the write operations in a 16_16 memristive crossbar using SPICE. The scrambler 126, the differential read module 130 and the message scheduler are simulated with the Perl script framework. The differential read is emulated by comparing the resistances of the adjacent cells.

TABLE 2

Memristor Team Model Parameters

| Parameter | Value | Standard deviation |
|---|---|---|
| Set Voltage | −15 V | 0 |
| Reset Voltage | 2.4 V | 0 |
| Period | 60 ns | 0 |
| D | $3 \times 10^{-9}$ m | 5% |
| $R_{on}$ | 100 Ω | 5% |
| $R_{off}$ | 20 kΩ | 5% |
| $i_{on}$ | −1 µA | 5% |
| $i_{off}$ | 1 µA | 5% |
| $a_{on}$ | 3 | 0 |
| $a_{off}$ | 3 | 0 |
| Window Function | Kvatinsky Window | N/A |

The Perl script prepares a separate SPICE deck for every message bit, translated to a single cycle in MemHash. At the end of each simulation step, the memristor state vector passes to the succeeding step. We use a Monte-Carlo method to emulate process variations, using the parameters in Table 2. The TEAM model parameters are tuned to keep the crossbar array in a balanced state to prevent saturation.

B. Dynamic Behavior

During simulation, the dynamic behavior of the system in a transient simulation is studied. For this purpose, we simulate the MemHash function with 10 randomly generated 32-bit message pairs. In each pair, the two messages differ by a single bit (Hamming Distance=1) located in the middle of the message (bit 15).

Figure 4:
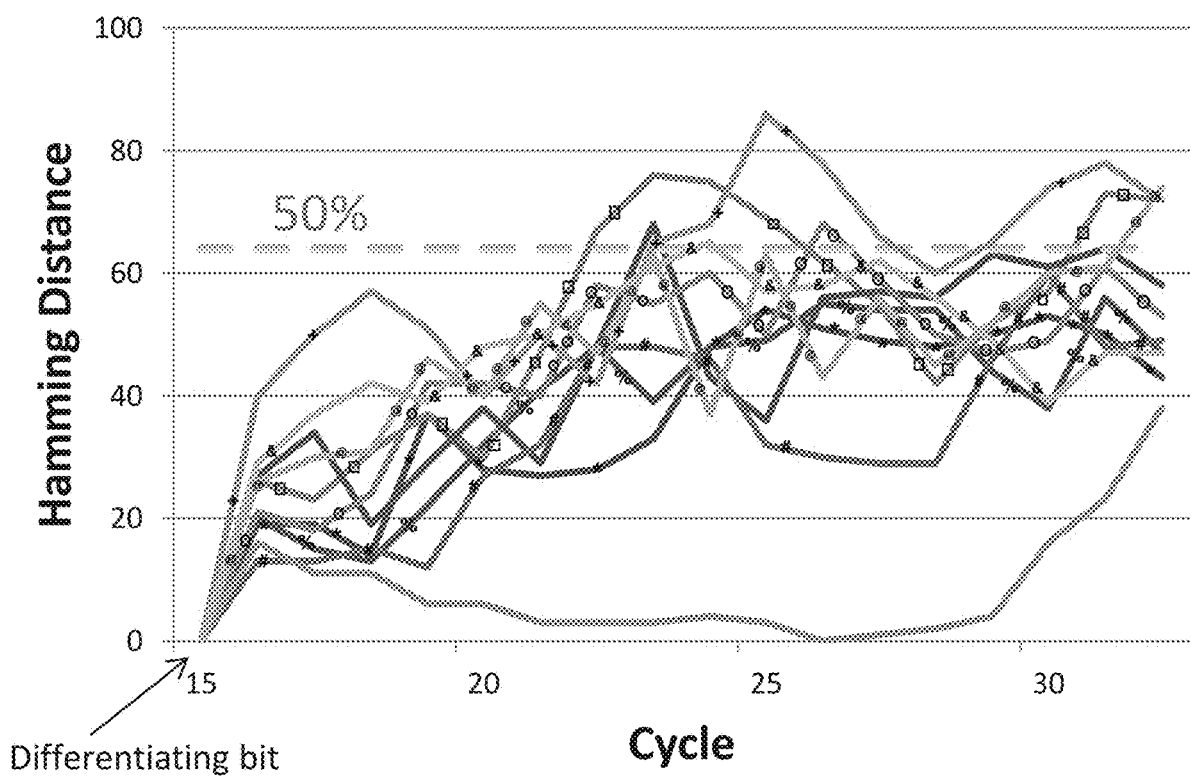
FIG. 4 is a graph showing the dynamic behavior of hashing according to the present embodiments to achieve a suitable Hamming distance between two messages differing by one bit.

Reference is now made to FIG. 4, which illustrates the dynamic behavior of the MemHash function. A Hamming Distance is measured between hash values of two messages differing in a single bit located in the middle of the message, and every line in the chart represents one such pair. The dotted line is the target distance of 50% of the bits in the hash value. In greater detail, after each cycle, the Hamming distance between the MemHash differential states of the two messages is measured. The hash size is 128; therefore, we expect a Hamming distance of 64 at maximum entropy. As FIG. 4 shows, the Hamming distances for nine of the message pairs, starting from the differentiating bit, grows to around 40% within eight cycles, that is within 8 cycles of the appearance of the differentiating bit. An additional observation is that once the hash values for the messages are separated, the Hamming distance stays in the same zone; namely, no reconvergence is observed.

These results indicate that the 8-bit suffix is in most cases sufficient to achieve an avalanche effect. However, for one message pair, the distance grows only after 16 cycles. Note that although the distance between the messages for this pair reaches 0 at cycle 27, the messages end up separated since every next step depends not only on a representation of the array state as a differential binary vector, but also on the analog state of the array.

C. Statistical Properties

The statistical performance of cryptographic hash functions can be evaluated using the confusion and diffusion criteria introduced by Shannon in 1945. Confusion reflects the sensitivity of the hash value to different parts of the key, and diffusion reflects the sensitivity to changes in the input data. Generally, a change in a single bit of the input message must result in a change of 50% of the hash value bits on average. MemHash shares several properties with the PUF structure. Hence, we combine these parameters with the PUF-related criteria.

The first parameter, uniqueness, reflects the variance between responses to the same message from different instances of the evaluated circuit. Uniqueness is measured in Hamming distance (HD) between the hash values.

The next parameter, diffuseness, reflects the variance between hash values for the same instance and different input messages. The uniqueness parameter reflects sensitivity to the key, and diffuseness reflects sensitivity to the data, corresponding to Shannon's diffusion and confusion respectively. Therefore, we expect both of the parameters to have an average value of 50%. The uniformity parameter reflects the balance between 0's and 1's in the hash value, and is obtained by summing up the bits in the hash value and dividing the result by the total number of bits. Finally, the bit—aliasing parameter reflects the balance of 0's and 1's obtained from different instances for every bit individually.

To obtain the diffuseness for MemHash, we generate 32 circuits according to Table 2. For every circuit, we run 32 different random messages. For other parameters, we generate 32 random messages and apply each of them to 32 different circuits. Table 3 shows the average and standard deviation figures obtained from the simulations.

Figure 5:
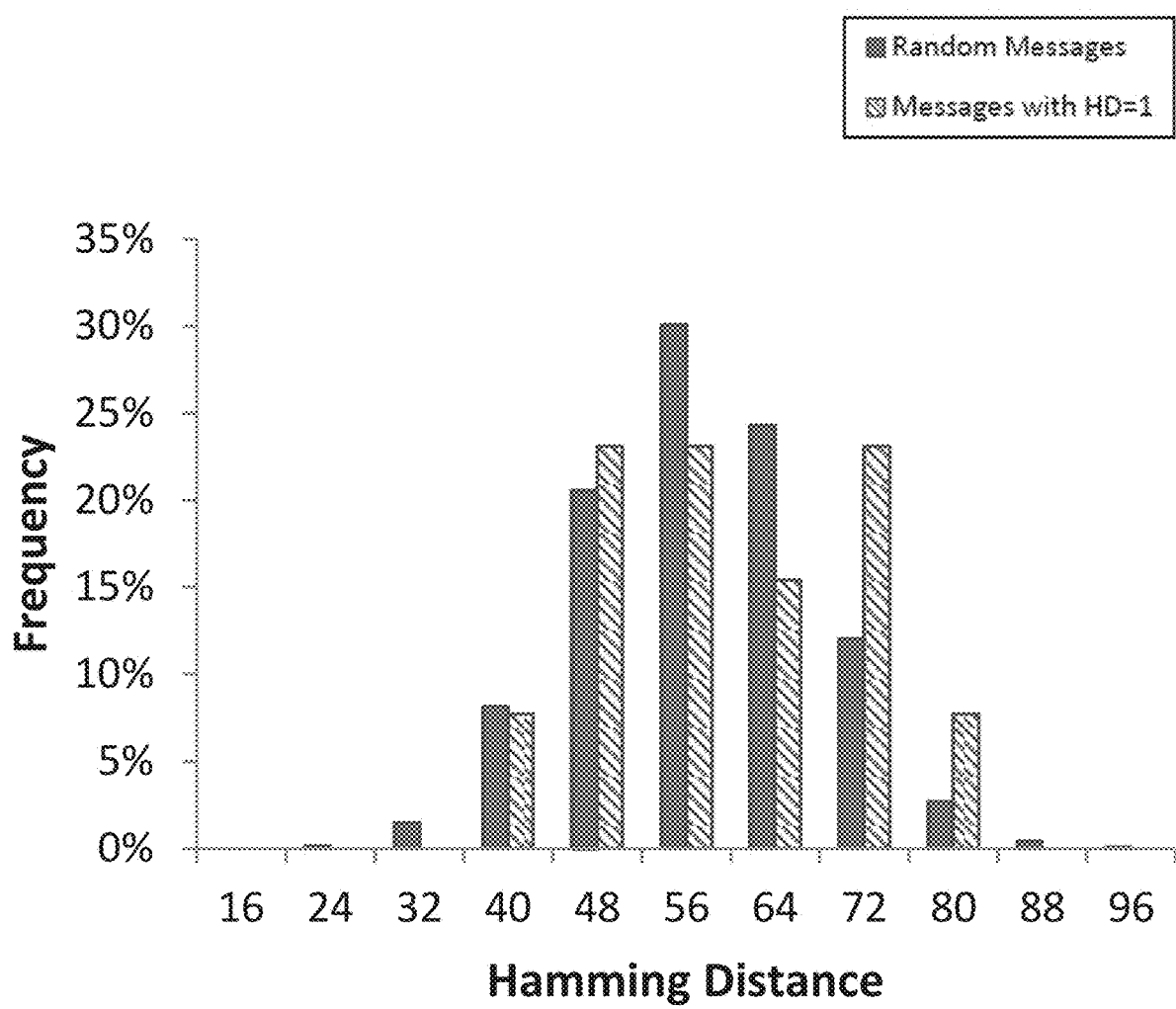
FIG. 5 is a diffuseness histogram as obtained by a simulation of hashing using the present embodiments, wherein Hamming distances are shown between hash values for different messages with the same circuit.

Reference is now made to FIG. 5, which shows a diffuseness histogram as obtained by the present simulation. Hamming distances are shown between hash values for different messages with the same circuit. The solid bars show the results for random messages, and the striped bars show the results for message pairs that differ by one bit. For all the parameters, we look to achieve an average of 50% and a small standard deviation. The uniqueness value is almost satisfactory. However, average diffuseness is off by 8% from the target. This can be explained by observing the bit-aliasing numbers for individual bits of the hash values, which reach values of up to 90%. We hypothesize that this phenomenon is caused by certain cell pairs being biased towards a specific differential state. An additional interesting observation is that the diffuseness statistics are identical for random messages and almost identical messages (HD=1). These results suggest that MemHash achieves entropy slightly lower than the maximum possible entropy with the given hash size.

TABLE 3

Statistical Evaluation

| Parameter | Average | Standard deviation |
|---|---|---|
| Uniqueness | 46% | 7.5% |
| Diffuseness (random) | 42% | 8% |
| Diffuseness (HD = 1) | 43% | 8% |
| Uniformity | 50% | 18% |
| Bit Aliasing | 50% | 18% |

General

The present embodiments provide a keyed hash function, which is a memristive hardware hash function, as exemplified by MemHash, that exploits the non-linear behavior of memristive devices. The present embodiments may take advantage of the write disturb phenomenon in memristive crossbar arrays, when writing to one cell affects other cells in the array. In addition, the present embodiments exploit manufacturing process variations to create unique keys for each instance of the function.

The MemHash of the present embodiments may be viewed as a dynamical system, in which time is a discrete space represented by cycles, and state space is the collection of all possible quasistable states of MemHash. In security analysis, various cryptanalysis techniques may be applied to MemHash to evaluate the one-wayness and collision-free properties. The obtained diffuseness and uniqueness values show that MemHash generates entropy slightly lower than the maximum. This weakness can be exploited to find collisions. In addition, modeling attacks try to extract the parameters of the system, which in the present case are the electrical parameters of the memristors, by applying different inputs and solving a system of equations. The differential read scheme makes such modeling attacks on MemHash unlikely to succeed.

It is expected that during the life of a patent maturing from this application many relevant variants of memristor technology will be developed and the scopes of the corresponding terms are intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. Apparatus for hashing a message, comprising:
an array of individually selectable memristor cells, the array being subject to write disturb in cells neighboring a selected cell and wherein said array is initiable into a state in which changes to said neighboring cells are predictable according to a respective proximity to a currently selected cell; and
an inserter configured for sequential insertion of bits into successively selected cells of the memristor array to form a succession of memristor array states, said memristor array states thereby forming a hash.

2. The apparatus of claim 1, further comprising a differential reader to read said memristor array states.

3. The apparatus of claim 1, further comprising a message input for entering a message as a sequence of bits for supplying to said inserter, wherein said inserter comprising a scrambler configured to scramble said bits with the hash for said successive insertion.

4. The apparatus of claim 3, wherein said message input is configured to add at least one prefix and at least one suffix to said message.

5. The apparatus of claim 3, wherein said memristor is in a quasi-stable state during said bit insertion.

6. The apparatus of claim 3, wherein said array is configured to be initialized to a known state.

7. The apparatus of claim 6, wherein said known state is a state wherein said array is balanced with a substantially equal number of cells in high and low states respectively.

8. The apparatus of claim 6, wherein said quasi-stable state is a state in which the rate of change of all the cells in the array is lower than a predetermined threshold.

9. The apparatus of claim 3, wherein the scrambler maintains an internal wraparound counter configured to count modulo the number of rows.

10. The apparatus of claim 9, wherein, at each cycle, said scrambler is configured to read from a row pointed by said internal wraparound counter.

11. The apparatus of claim 10, wherein said scrambler is configured to implement a linear function of an input bit, a cycle count and a value read from the array and to generate an address and a value for writing into said array.

12. The apparatus of claim 1, wherein said array is a crossbar array with at least 256 cells.

13. The apparatus of claim 1, wherein said write disturb is sensitive to manufacturing processes.

14. Method for hashing a message, comprising:
providing an array of individually selectable memristor cells, the array being subject to write disturb in cells neighboring a selected cell;
initializing said array into a quasi-stable state in which changes to said neighboring cells are predictable according to a respective proximity to a currently selected cell;
sequentially selecting cells in said array; and
sequentially inserting bits into currently selected cells of the memristor array to form a succession of memristor array states, a final one of said memristor array states thereby forming a hash.

15. The method of claim 14, comprising differentially reading said memristor array to read said hash.

16. The method of claim 14, comprising entering a message as a sequence of bits and scrambling said bits for said sequentially inserting.

17. The method of claim 14, wherein said changes to non-selected cells form part of said hash.

18. The method of claim 14, comprising initializing said array into a predetermined state.

19. The method of claim 14, comprising initializing said array into a known state having substantially equal numbers of cells in alternating high and low states.

20. The method of claim 19, wherein said initializing comprises initializing write operations, said initializing write operations being carried out sufficiently slowly, at a lower voltage than non-initializing write operations, to prevent occurrence of write disturb within said array.

21. The method of claim 14, wherein said quasi-stable state is a state in which the rate of change of all the cells in the array is lower than a predetermined threshold.

22. The method of claim 14, counting modulo a number of rows in said array to select cells.

23. The method of claim 22, comprising at each cycle reading from a row pointed by said modulo counting.

24. The method of claim 23, comprising implementing a linear function of an input bit, a cycle count and a value read from the array and generating an address and a value for writing into said array.

25. The method of claim 14, further comprising adding at least one prefix and/or at least one suffix to said message prior to said sequentially inserting or prior to said scrambling.

* * * * *